July 29, 1952 K. M. ROOKER 2,605,129
DRAG HOOK
Filed Feb. 13, 1950
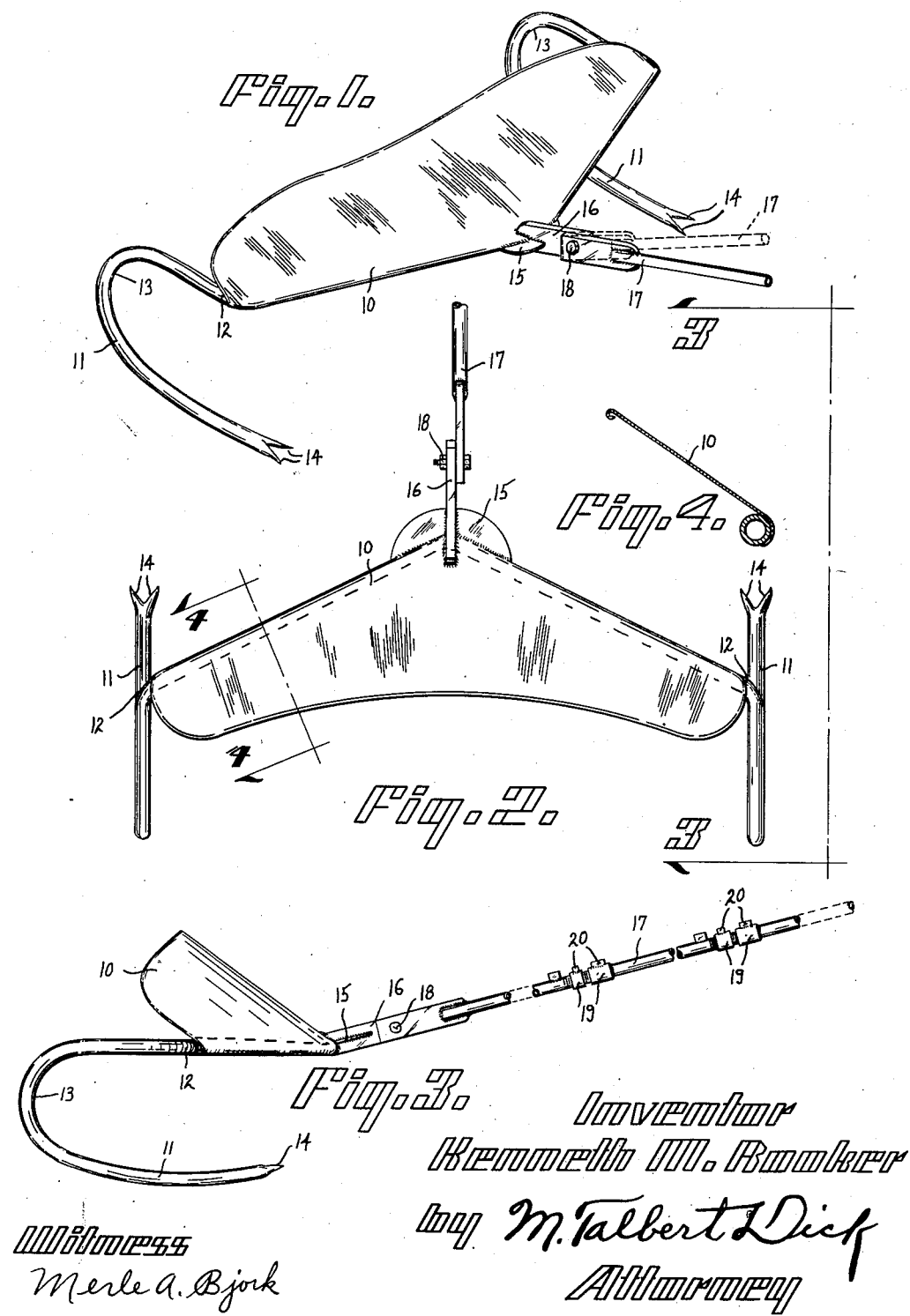
Inventor
Kenneth M. Rooker
by M. Talbert Dick
Attorney
Witness
Merle A. Bjork

Patented July 29, 1952

2,605,129

UNITED STATES PATENT OFFICE 2,605,129

DRAG HOOK

Kenneth M. Rooker, Des Moines, Iowa

Application February 13, 1950, Serial No. 143,990

6 Claims. (Cl. 294—66)

My invention relates to a drag hook for use in recovering submerged objects.

The principal object of this invention is to provide a drag hook that is designed to remain afloat while being maneuvered away from the operator over a body of water to a point of submersion and which will quickly submerge when moved toward the operator, thereby making it an especially useful device to be used from the shore line or a bridge when conditions may render it impossible or undesirable to operate such a hook from the surface of the water.

A further object of this device is to provide such a drag hook of the above class with a forked hook whereby any damage such as tearing or the like to a submerged human body is materially reduced when compared to pointed barbed hooks now commonly in use.

A still further object of this invention is to provide a drag hook of the character described that is capable of carrying a plurality of hooks arranged transversely to their direction of travel through the water.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawings, in which:

Fig. 1 is a perspective view of this device showing a fragmentary portion of a handle attached thereto, Fig. 2 is a top view of the device of Fig. 1, Fig. 3 is a side view of this hook taken on the line 3—3 of Fig. 2 and showing fragmentary portions of a sectional handle therefore, and Fig. 4 is a cross-sectional view of this device taken on the line 4—4 of Fig. 2.

Referring to the drawings I have used the numeral 10 to designate a wing-like member that is generally triangular in shape similar to the wing of a bat, as shown in Fig. 2. However, the triangular shape is not critical and any shape that will present a flat surface may be employed. This wing 10 is curved transversely to its longitudinal axis to present an extended inverted U-shaped underside.

The numeral 11 designates a pair of spaced apart hook members that are preferably formed from a single length of metal tubing or rod. This tubing is bent at its center so that the resulting arm portions will extend laterally and rearwardly to the bend points 12 at such an angle to conform generally to the forward marginal outline of the wing 10. From the bend points 12 each arm portions then extend rearwardly and substantially parallel to each other and are then bent downwardly into a U bend 13 so that the free ends thereof extend below and forwardly of the bend points 12, as shown in Figs. 1 and 2. A two prong forked point 14 is formed on the free end of each of the hooks 11.

These hooks 11 may be made singly but I have preferably made them of one length of tubing to add strength to this device as will later be apparent from the description to follow.

That portion of the tubing or rod between the two hooks 11 is secured in any suitable manner to the underside of the forward marginal edge of the wing 10. This is easily done since this portion of the tubing, as previously described, is originally bent to conform to the shape of the forward edge of the wing. Obviously, since this wing is curved, the rear end must be elevated so the tubing between the hooks can make continuous contact with the forward edge of this wing. Thus, secured, the wing and hooks will appear as illustrated in Fig. 3. An arcuate connecting plate 15 is secured to the forward center portion of the wing 10 and a connecting bar 16 is secured to the plate 15 and extends forwardly therefrom, as shown in Fig. 1.

To this connecting bar 16 I show a handle member 17 vertically hingably secured thereto by any suitable means such as the bolt and nut 18. The handle 17 may consist of a single length of tubing, rod or the like or it may be sectional for longitudinal adjustment. Such a sectional handle is shown in Fig. 3 where the respective sections are detachably secured together by a coupling 19 provided with studs 20 for facilitating the tightening or loosening thereof. Also, the handle may consist of any flexible material such as cable or the like.

The advantages of this device are especially apparent when it is used from the bank of a body of water. From such a position it is pushed out over the water by means of the handle so that its direction of travel is opposite to that in which the forked points 14 are directed.

As this is done the underside of the wing will offer resistance to the water and keep this hook from sinking. Consequently, this device can be maneuvered over the surface of the water to any point at which the dragging is to commence.

When this point has been reached, the operator then pulls this device in the direction the forked points are directed and as travel in this direction commences, the construction of the wing as shown in Fig. 3 will cause this hook to submerge so that the hooks can engage any obstacle in its path. Heretofore pointed barbed hooks have generally been used on drag hooks and these have caused considerable tearing and the like when the object sought and found was a human body.

In this respect the forked points 14 will materially reduce such damage. If the body is clothed, as it usually is, the forked points 14 will not be apt to penetrate far enough to produce any tearing or lacerating of the flesh at all.

The hook members 11 as illustrated in Figs. 1 and 3 are capable of serving as runners while submerged when this device is pushed away from the operator. The U portion of the hooks, in this respect, permit the hooks to ride over any object that may be contacted so that by reversing the movement of the hooks this device can engage any object so located.

Some changes may be made in the construction and arrangement of my drag hook without departing from the real spirit and purpose of my invention, and it is my intention to cover by my claims, any modified forms of structure or use of mechanical equivalents which may be reasonably included within their scope.

I claim:

1. In a drag hook, a wing member curved transversely to its shorter axis to present an inverted U-shaped underside; said wing member constructed so that its width extends forwardly and downwardly with the inverted U-shaped underside extending upwardly and rearwardly; said inverted U-shaped underside capable of offering resistance to submerging when said device is moved rearwardly over a body of water and the top side of said wing member capable of yielding to the force of water and submerging when this device is moved forwardly over a body of water, a hook member on said wing member, and a rigid handle member secured to said wing member.

2. In a drag hook, a wing member curved transversely to its shorter axis to present an inverted U-shaped underside; said wing member constructed so that its width extends forwardly and downwardly with the inverted U-shaped underside extending upwardly and rearwardly; said inverted U-shaped underside capable of offering resistance to submerging when said device is moved rearwardly over a body of water and the top side of said wing member capable of yielding to the force of water and submerging when this device is moved forwardly over a body of water, a hook member on each end of said wing member, and a control means operatively secured to said wing member and designed to extend to the operator thereof.

3. In a drag hook, an arcuate wing member presenting an inverted U-shaped underside and constructed so that its width extends forwardly and downwardly with the inverted U-shaped underside extending upwardly and rearwardly; said inverted U-shaped underside capable of offering resistance to submerging when said device is moved rearwardly over a body of water and the top side of said wing member capable of yielding to the force of water and submerging when this device is moved forwardly over a body of water, a hook member on each end of said wing member integrally formed from a single length of material; said material intermediate said hook members conforming in shape to the forwardly edge portion of said arcuate member and secured thereto and a rigid handle secured to said arcuate wing member.

4. In a drag hook, an arcuate wing member presenting an inverted U-shaped underside and constructed so that its width extends forwardly and downwardly with the inverted U-shaped underside extending upwardly and rearwardly; said inverted U-shaped underside capable of offering resistance to submerging when said device is moved rearwardly over a body of water and the top side of said wing member capable of yielding to the force of water and submerging when this device is moved forwardly over a body of water, a hook member having a forked point on each end of said wing member integrally formed from a single length of material; said material intermediate said hook members conforming in shape to the forwardly edge portion of said arcuate member and secured thereto and a rigid sectional handle vertically hingably secured to said arcuate wing member.

5. In a drag hook, a triangular wing shaped member having two forward edges and one trailing edge; said triangular wing member being arcuate to present an inverted U-shaped underside and constructed so that said device is placed in a body of water with the forward edges thereof at the surface and the trailing edge elevated from and to the rear of said forwardly edges, a length of rod material bent so the resulting length portions conform to the marginal outline of said forwardly edges and are secured thereto; said length portions extending rearwardly and substantially parallel to each other to a point beyond the rear of said trailing edge and then bent downwardly into a U-bend so that the free ends thereof extend forwardly to the approximate forwardly point of said forwardly edges to form a hook member on two opposite points of said triangular wing member and a handle member on said wing member.

6. In a drag hook, a triangular wing shaped member having two forward edges and one trailing edge; said triangular wing member being arcuate to present an inverted U-shaped underside and constructed so that said device is placed in a body of water with the forward edges thereof at the surface and the trailing edge elevated from and to the rear of said forwardly edges, a length of rod material bent so the resulting length portions conform to the marginal outline of said forwardly edges and are secured thereto; said length portions extending rearwardly and substantially parallel to each other to a point beyond the rear of said trailing edge and then bent downwardly into a U-bend so that the free ends thereof extend forwardly to the approximate forwardly point of said forwardly point of said forwardly edges to form a hook and runner member on two opposite points of said triangular wing member and a rigid handle member on said wing member.

KENNETH M. ROOKER.

REFERENCES CITED

The following references are of record in the file of this patent:

UNITED STATES PATENTS

| Number | Name | Date |
|--------|------|------|
| 897,620 | Heyn | Sept. 1, 1908 |